United States Patent
Zacher

(10) Patent No.: US 10,826,284 B2
(45) Date of Patent: Nov. 3, 2020

(54) SELF-TRIPPING EXPLOSIVE FUSE

(71) Applicant: Dr. Ing. h.c. F. Porsche Aktiengesellschaft, Stuttgart (DE)

(72) Inventor: Marcus Zacher, Sindelfingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 319 days.

(21) Appl. No.: 15/952,414

(22) Filed: Apr. 13, 2018

(65) Prior Publication Data

US 2018/0342862 A1 Nov. 29, 2018

(30) Foreign Application Priority Data

May 24, 2017 (DE) .................. 10 2017 111 413

(51) Int. Cl.

| | |
|---|---|
| *H02H 3/08* | (2006.01) |
| *H01H 85/00* | (2006.01) |
| *H01H 85/46* | (2006.01) |
| *H01H 39/00* | (2006.01) |
| H01H 85/02 | (2006.01) |
| H01H 71/14 | (2006.01) |

(52) U.S. Cl.
CPC .......... *H02H 3/085* (2013.01); *H01H 39/006* (2013.01); *H01H 85/0039* (2013.01); *H01H 85/46* (2013.01); *H01H 71/14* (2013.01); *H01H 85/0241* (2013.01); *H01H 2085/0283* (2013.01)

(58) Field of Classification Search
CPC ........ H02H 3/08; H02H 3/085; H01H 39/006; H01H 85/0039; H01H 85/0047; H01H 85/40; H01H 71/14; H01H 85/0241; H01H 2085/0283

See application file for complete search history.

(56) References Cited

U.S. PATENT DOCUMENTS 4,859,819 A * 8/1989 Weldon ................ H01H 33/002
218/8
6,556,119 B1   4/2003 Lell
(Continued)

FOREIGN PATENT DOCUMENTS

CN   201243191 Y    5/2009
CN   106602513 A    4/2017
(Continued)

OTHER PUBLICATIONS

Chinese Office Action for Chinese Application No. 2018104869194, dated Sep. 25, 2019, 7 pages.
(Continued)

*Primary Examiner* — Adolf D Berhane
(74) *Attorney, Agent, or Firm* — RatnerPrestia

(57) ABSTRACT

A method for operating a protective apparatus and a protective apparatus, in particular a self-tripping explosive fuse, wherein the protective apparatus includes a fuse element, which is designed to interrupt a conductor section by an explosion. A tripping unit is designed to trip the explosion by an ignition voltage ($U_z$) when the ignition voltage exceeds a prescribed value. The protective apparatus has a thermoelectric element, which generates the ignition voltage ($U_z$) depending on heating of the conductor section.

11 Claims, 2 Drawing Sheets

(56) References Cited

U.S. PATENT DOCUMENTS

| | | | |
|---|---|---|---|
| 8,319,377 B2 | 11/2012 | Beck | |
| 10,630,092 B2 * | 4/2020 | Metzger | H02J 7/0068 |
| 2010/0086312 A1 * | 4/2010 | Keita | H04B 10/802 |
| | | | 398/140 |
| 2012/0218674 A1 * | 8/2012 | Schultz | H02H 3/085 |
| | | | 361/93.8 |
| 2016/0155589 A1 | 6/2016 | Mangeant | |
| 2016/0336131 A1 * | 11/2016 | Fellmer | H01H 39/006 |
| 2016/0356587 A1 | 12/2016 | Perichon | |
| 2017/0076900 A1 * | 3/2017 | Iwai | H01H 37/761 |
| 2018/0277325 A1 * | 9/2018 | De Palma | H01H 9/106 |
| 2019/0123542 A1 * | 4/2019 | Kambham | G01R 19/165 |
| 2019/0348245 A1 * | 11/2019 | Henricks | H01H 85/0241 |
| 2019/0362924 A1 * | 11/2019 | Zhou | H01H 85/165 |
| 2020/0031240 A1 * | 1/2020 | Albrecht | B60L 3/0061 |

FOREIGN PATENT DOCUMENTS

| | | |
|---|---|---|
| DE | 1011125 B | 6/1957 |
| DE | 19817133 A1 | 10/1999 |
| DE | 102009036216 A1 | 2/2011 |
| GB | 2489101 A | 9/2012 |
| JP | S51066467 A | 6/1976 |
| JP | 10214556 A | 8/1998 |

OTHER PUBLICATIONS

Notification of Reason for Rejection for Japanese Application No. 2018-098416, dated May 8, 2019, 2 pages.

Chinese Office Action for Chinese Application No. 2018104869194, dated Apr. 30, 2019, 7 pages.

German Search Report for German Application No. 10 2017 111 413.0, dated Nov. 6, 2017 with partial English translation, 7 pages.

Chinese Office Action for Chinese Application No. 2018104869194, dated Feb. 25, 2020, with translation, 12 pages.

Indian Examination Report for Indian Application No. 201814015097, dated Jul. 6, 2020, with translation, 7 pages.

* cited by examiner

SELF-TRIPPING EXPLOSIVE FUSE

CROSS-REFERENCE TO RELATED APPLICATION

This application claims priority to German Patent Application No. DE 10 2017 111 413.0, filed May 24, 2017, which is incorporated by reference herein in its entirety.

FIELD OF THE INVENTION

The invention relates to a self-tripping explosive fuse.

BACKGROUND OF THE INVENTION

Self-tripping explosive fuses are protective apparatuses, which automatically interrupt a circuit in the event of a short circuit or overcurrent in the circuit.

Known explosive fuses, which interrupt the circuit when a fault state has been identified in the circuit, that is to say a short circuit or an overcurrent, require current measurement devices and monitoring electronics in order to trip an ignition of a pyroswitch by which the circuit is interrupted. Overcurrent in this case refers to a state of the circuit in which a current above an expected current is flowing.

DE 1011125, which is incorporated by reference herein in its entirety, discloses a protective apparatus of this kind having a pyroswitch for interrupting a circuit in the case of overcurrent.

GB 2489101, which is incorporated by reference herein in its entirety, US 20160155589, which is incorporated by reference herein in its entirety, and US 20160336131, which is incorporated by reference herein in its entirety, each relate to a protective apparatus in which a pyroswitch is externally actuated to interrupt a circuit.

US 20160356587, which is incorporated by reference herein in its entirety, discloses a protective apparatus in which a pyroswitch is tripped to interrupt a circuit by way of a fault in the circuit.

SUMMARY OF THE INVENTION

It is desirable to provide a self-tripping explosive fuse that operates reliably even without external current measurement devices and monitoring electronics. This is achieved by the protective apparatus and the method for operating said protective apparatus in accordance with the following description.

With respect to the protective apparatus, there is provision for the protective apparatus to comprise a fuse element, which is designed to interrupt a conductor section by means of explosion, wherein a tripping unit is designed to trip the explosion by means of an ignition voltage when the ignition voltage exceeds a prescribed value, wherein the protective apparatus has a thermoelectric element, which generates the ignition voltage depending on heating of the conductor section.

The conductor section is advantageously DC-isolated from the fuse element and the tripping unit. This prevents the circuit from being closed by the fuse element itself in the event of a fault.

The thermoelectric element preferably generates a first voltage depending on the heating of the conductor section, wherein the protective apparatus has an amplifier circuit, which is designed to amplify the first voltage to generate the ignition voltage. As a result, the self-tripping explosive fuse can also be used at lower voltage changes to generate the required ignition voltage.

The protective apparatus preferably comprises a voltage supply for supplying the amplifier circuit with voltage. The self-tripping explosive fuse is therefore self-sufficient.

The amplifier circuit is preferably designed to amplify the first voltage to generate a second voltage, wherein the protective apparatus has a series circuit composed of the tripping unit and a Zener diode, across which Zener diode the second voltage is dropped, wherein the Zener diode is arranged in a reverse direction with respect to the second voltage, with the result that a current flows through the Zener diode and thus through the tripping unit only when the second voltage exceeds a prescribed voltage value. This is a particularly expedient circuit arrangement for the self-tripping explosive fuse.

The protective apparatus advantageously comprises a capacitor, which is arranged in parallel connection with the series circuit. The capacitor serves as a buffer capacitor.

The protective apparatus advantageously comprises a parallel resistor, which is arranged in parallel connection with the series circuit and the capacitor. The parallel resistor makes it possible to fixedly prescribe specific thresholds for the voltage at which the self-tripping occurs.

The parallel resistor can preferably be set in a variable manner. As a result, the threshold for the voltage at which the self-tripping occurs can be parameterized in a simple manner.

The tripping unit advantageously has a first contact, which is electrically conductively connected to a first tripping contact, wherein the tripping unit has a second contact, which is electrically conductively connected to a second tripping contact, wherein the ignition voltage is dropped between the first contact and the second contact. As a result, the ignition voltage can also be prescribed externally so as to be compatible with already existing systems.

With respect to the method for operating a protective apparatus, a conductor section is interrupted by means of explosion when an ignition voltage for tripping the explosion exceeds a prescribed value, wherein a thermoelectric element generates the ignition voltage depending on heating of the conductor section.

BRIEF DESCRIPTION OF THE DRAWINGS

Further advantageous refinements emerge from the following description and the drawing. In the drawing.

DETAILED DESCRIPTION OF THE INVENTION

Figure 1:
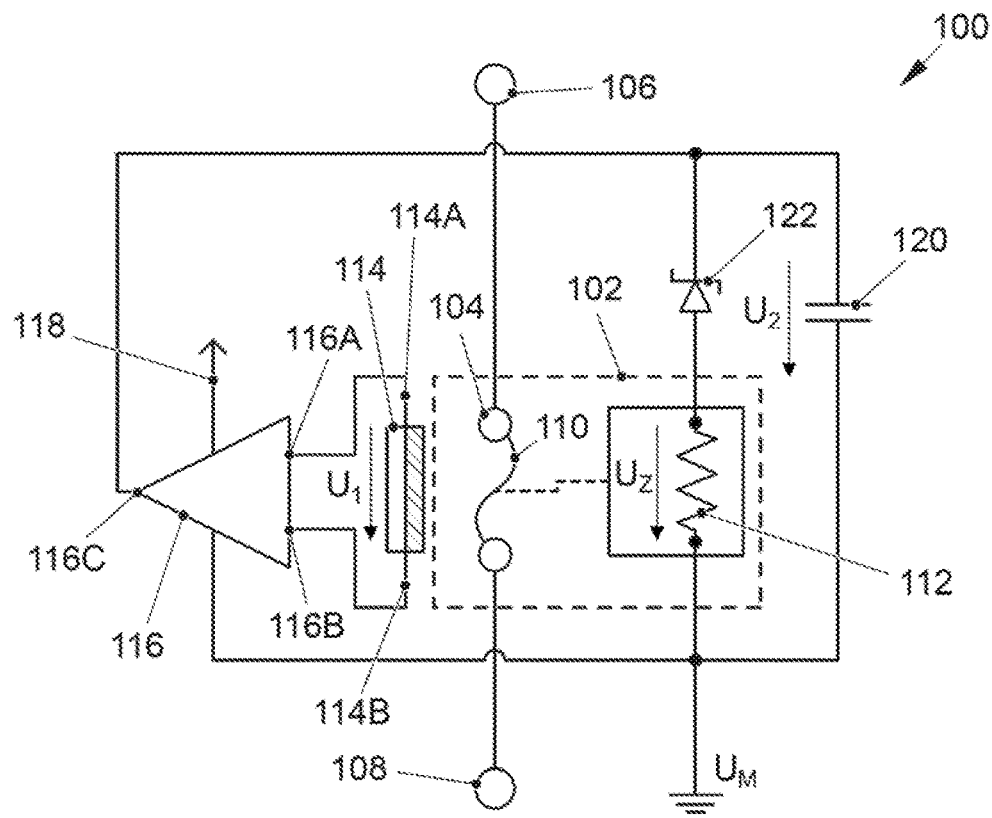
FIG. 1 schematically shows parts of a protective apparatus.

FIG. 1 schematically shows parts of a protective apparatus 100. More specifically, FIG. 1 illustrates a circuit diagram of a self-tripping explosive fuse.

The protective apparatus 100 comprises an explosive fuse 102. The explosive fuse 102 comprises an explosive-fuse element 104 having a positive power connection 106 and a negative power connection 108 for connection to a circuit that is to be monitored. The positive power connection 106 is electrically conductively connected to the negative power connection 108 by means of the explosive-fuse element 104. If the explosive fuse 102 is tripped, a conductor section 110 in the explosive-fuse element 104 is severed with the aid of a small explosive charge, with the result that the circuit is interrupted. The conductor section 110 is that part of the electrically conductive connection of the circuit between a positive power connection 106 and a negative power connection 108 in the explosive fuse 102 that is interrupted.

A tripping unit 112 is arranged in the explosive fuse 102 to ignite the explosive charge. The tripping unit 112 is operatively connected to the explosive charge and ignites the explosive charge if an ignition voltage $U_Z$ of a prescribed magnitude is dropped across the tripping unit 112.

When current in the circuit flows through the fuse element 104, the fuse element 104, more specifically the conductor section 110, heats up. The protective apparatus 100 comprises a thermoelectric element 114, which is arranged with respect to the fuse element 104 in such a way that the thermoelectric element 114 likewise heats up when the fuse element 104 heats up. The thermoelectric element 114 is, for example, a Peltier element in which a first voltage $U_1$ can be generated between a first output 114 A and a second output 114 B of the thermoelectric element 114 depending on the heating of the thermoelectric element 114 through the Seebeck effect. The first output 114 A is electrically conductively connected to a first input 116 A of an amplifier circuit 116. The amplifier circuit 116 is, for example, an operational amplifier. The second output 114 B is electrically conductively connected to a second input 116 B of the amplifier circuit 116. The first voltage $U_1$ is also applied between the two inputs of the amplifier circuit 116 and amplified by said amplifier circuit. To this end, the amplifier circuit 116 is preferably supplied with a supply voltage $U_V$ with respect to a ground potential $U_M$ by a voltage source 118. An output 116 C of the amplifier circuit 116 is connected to the ground potential $U_M$ by means of a capacitor 120. A second voltage $U_2$ is dropped across the capacitor 120. The second voltage $U_2$ corresponds to the amplified first voltage $U_1$. The capacitor 120 acts as a buffer capacitor for the second voltage $U_2$. A series circuit of the tripping unit 112 with a Zener diode 122 is arranged between the output 116 C of the amplifier circuit 116 and the ground potential $U_M$ in parallel with the capacitor 120. The Zener diode 122 is arranged in the reverse direction with respect to the second voltage $U_2$, that is to say a current flows through the Zener diode 122 and thus through the tripping unit 112 only when the second voltage $U_2$ exceeds a prescribed voltage value. Instead of the Zener diode 122, there may also be provision for another device, which prevents the flow of current through the tripping unit 112 as long as the second voltage $U_2$ does not exceed the prescribed voltage value. The Zener diode 122, the capacitor 120 and/or the tripping unit 112 are preferably dimensioned in such a way that the ignition voltage $U_Z$ is reached when the second voltage $U_2$ exceeds the prescribed voltage value, that is to say when the Zener diode 122 becomes electrically conducting in the reverse direction thereof. As a result, the tripping unit ignites the explosive charge as soon as the first voltage $U_1$ exceeds a value for which the amplified second voltage $U_2$ exceeds the prescribed voltage value.

When a fault arises in the circuit, that is to say, for example, an overcurrent or a short circuit, the fuse element 104 heats up compared to the fault-free case. When the first voltage $U_1$ generated by the additional heat in the thermoelectric element 114 leads to the second voltage $U_2$ exceeding the prescribed voltage value, the explosion is tripped and the fuse element 104 is tripped. In the example, the conductor section 110 is severed. As a result, the circuit is interrupted.

The protective apparatus 100 comprises a closed housing that is preferably electrically insulated from the rest of the circuit. The positive power connection 106 and the negative power connection 108 can be contacted from outside of the housing.

Figure 2:
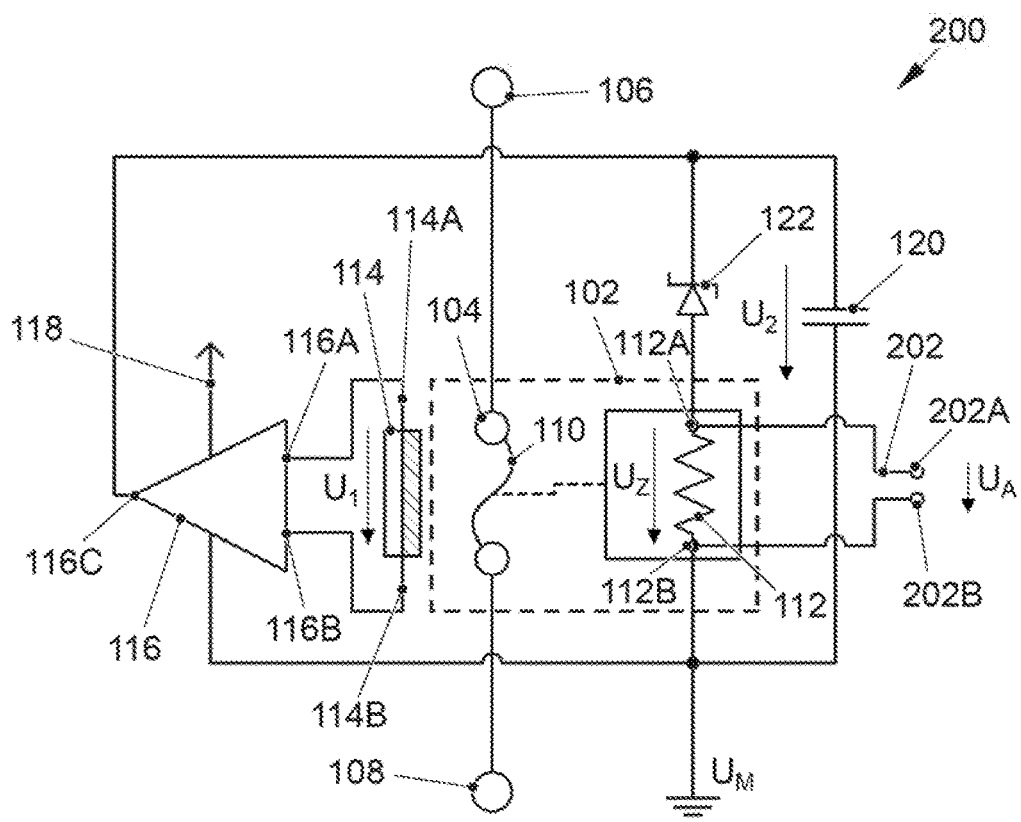
FIG. 2 schematically shows parts of a protective apparatus having a connection for an external tripping system, FIG. 3 schematically shows parts of a protective apparatus having a parallel resistor, FIG. 4 schematically shows parts of a protective apparatus having a connection for an external tripping system and having a parallel resistor.

FIG. 2 schematically shows parts of a protective apparatus 200 having a connection for an external tripping system 202. More specifically, FIG. 2 illustrates a circuit diagram of a self-tripping explosive fuse having the connection for the external tripping system 202. A first tripping contact 202 A is electrically conductively connected to a first contact 112 A of the tripping unit 112. A second tripping contact 202 B is electrically conductively connected to a second contact 112 B of the tripping unit 112. The tripping voltage $U_A$ is dropped between the first contact 112 A and the second contact 112 B. The protective apparatus 200 comprises the preferably closed housing. The first tripping contact 202 A and the second tripping contact 202 B can be contacted from outside of the housing. The other elements correspond to the self-tripping explosive fuse, which elements have been described above in relation to FIG. 1. The same reference numerals are used for these elements in FIG. 2 as have been used in FIG. 1.

By applying a tripping voltage $U_A$ to the two contacts of the connection for the external tripping system 202, the explosion can be tripped when the tripping voltage $U_A$ reaches or exceeds the ignition voltage $U_Z$. Therefore, external tripping is furthermore possible. This makes the protective apparatus compatible with other tripping units.

Figure 3:
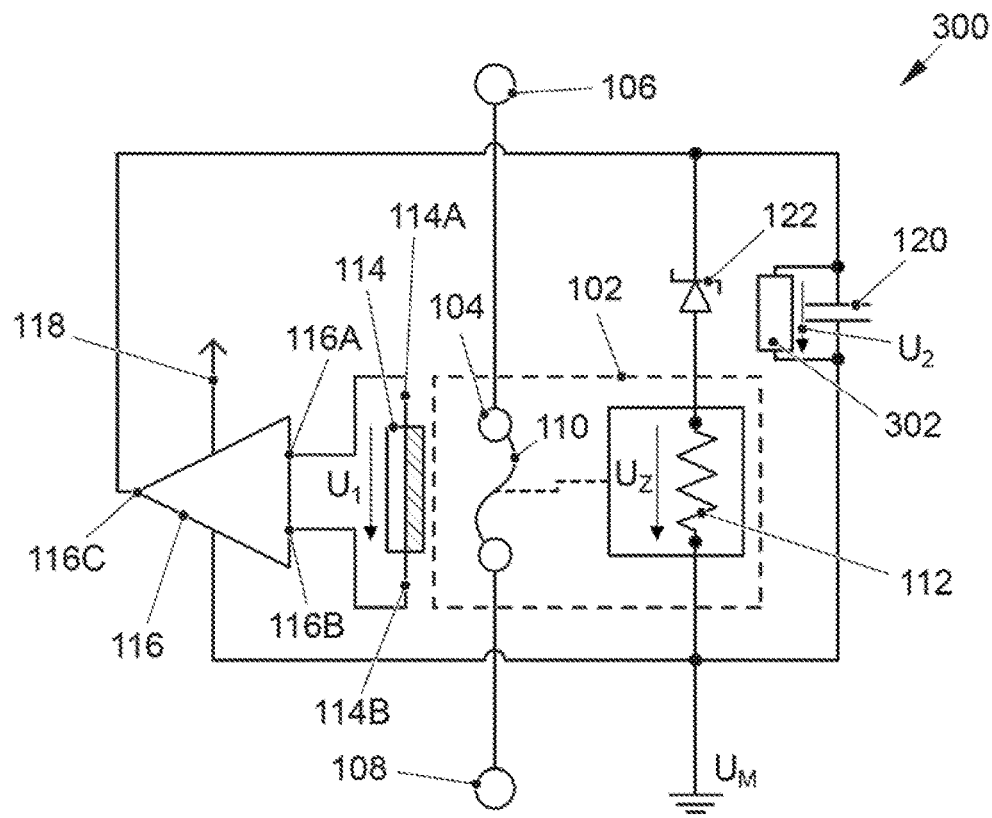

FIG. 3 schematically shows parts of a protective apparatus 300 having a parallel resistor 302. More specifically, FIG. 3 illustrates a circuit diagram of a self-tripping explosive fuse having the parallel resistor 302. The other elements correspond to the self-tripping explosive fuse, which elements have been described above in relation to FIG. 1. The same reference numerals are used for these elements in FIG. 3 as have been used in FIG. 1. By suitably selecting the parallel resistor 302, the second voltage $U_2$ can be dimensioned to fit with the other elements of the circuit. As a result, the prescribed voltage value can easily be prescribed for different applications depending on the resistance value of the parallel resistor 302. The parallel resistor can preferably be set in a variable manner. The parallel resistor is, for example, a potentiometer. As a result, the tripping speed can be set.

Figure 4:
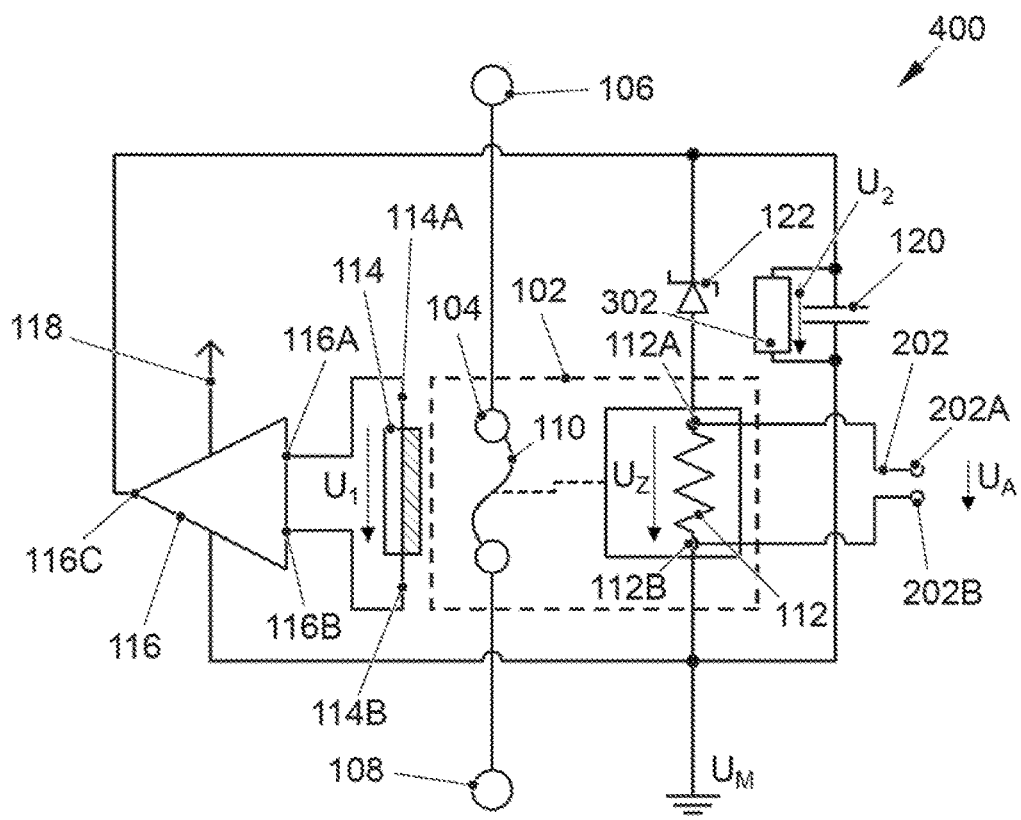

FIG. 4 schematically shows parts of a protective apparatus 400 having the connection for an external tripping system 202 and having the parallel resistor 302. More specifically, FIG. 4 illustrates a circuit diagram of a self-tripping explosive fuse having the connection for the external tripping system 202 as described in relation to FIG. 2 and having the parallel resistor 302 as described in relation to FIG. 3. The other elements correspond to the self-tripping explosive fuse, which elements have been described above in relation to FIG. 1. The same reference numerals are used for these elements in FIG. 4 as have been used in FIG. 1.

In each of the aforementioned circuit diagrams, the circuit is DC-isolated from the protective apparatus 100. As a result, a current across the protective apparatus 100 also cannot lead to unintentional closing of the circuit when the explosive fuse is tripped.

A method for operating a protective apparatus 100 makes provision for the conductor section 110 to be interrupted when the ignition voltage $U_Z$ exceeds the prescribed value, wherein the thermoelectric element 114 generates the ignition voltage $U_Z$ depending on heating of the conductor section 110.

What is claimed is:

1. A protective apparatus comprising:
   a fuse element configured to interrupt a conductor section by means of an explosion,
   a tripping unit configured to trip the explosion by an ignition voltage ($U_Z$) when the ignition voltage ($U_Z$) exceeds a prescribed value, and
   a thermoelectric element which is arranged adjacent the conductor section of the fuse element for sensing heat emitted by the conductor section and generates and then conducts the ignition voltage ($U_Z$) to the tripping unit depending on heating of the conductor section.

2. The protective apparatus as claimed in claim 1, wherein the conductor section is DC-isolated from the fuse element and the tripping unit.

3. A protective apparatus comprising:
   a fuse element configured to interrupt a conductor section by means of an explosion,
   a tripping unit configured to trip the explosion by an ignition voltage ($U_Z$) when the ignition voltage ($U_Z$) exceeds a prescribed value, and
   a thermoelectric element which generates the ignition voltage ($U_Z$) depending on heating of the conductor section,
   wherein the thermoelectric element generates a first voltage ($U_1$) depending on the heating of the conductor section, and wherein the protective apparatus has an amplifier circuit, which is configured to amplify the first voltage ($U_1$) for generating the ignition voltage ($U_Z$).

4. The protective apparatus as claimed in claim 3, wherein the protective apparatus comprises a voltage supply for supplying the amplifier circuit with voltage.

5. The protective apparatus as claimed in claim 4, wherein the amplifier circuit is configured to amplify the first voltage ($U_1$) to generate a second voltage ($U_2$), wherein the protective apparatus has a series circuit composed of the tripping unit and a Zener diode, across which Zener diode the second voltage ($U_2$) is dropped, wherein the Zener diode is arranged in a reverse direction with respect to the second voltage ($U_2$), with the result that a current flows through the Zener diode and through the tripping unit only when the second voltage ($U_2$) exceeds a prescribed voltage value.

6. The protective apparatus as claimed in claim 5, wherein the protective apparatus comprises a capacitor, which is arranged in parallel connection with the series circuit.

7. The protective apparatus as claimed in claim 6, wherein the protective apparatus comprises a parallel resistor, which is arranged in a parallel connection with the series circuit and with the capacitor.

8. The protective apparatus as claimed in claim 7, wherein the parallel resistor is configured to be set in a variable manner.

9. The protective apparatus as claimed in claim 1, wherein the tripping unit has a first contact, which is electrically conductively connected to a first tripping contact, wherein the tripping unit has a second contact, which is electrically conductively connected to a second tripping contact, wherein the ignition voltage ($U_Z$) is dropped between the first contact and the second contact.

10. A method for operating a protective apparatus, comprising:
    interrupting a conductor section of a fuse element by means of an explosion generated by a tripping unit when an ignition voltage ($U_Z$) for tripping the explosion exceeds a prescribed value,
    generating the ignition voltage ($U_Z$) using a thermoelectric element arranged adjacent the conductor section of the fuse element depending on heating of the conductor section, and
    conducting the ignition voltage ($U_Z$) from the thermoelectric element to the tripping unit for generating the explosion.

11. The method of claim 10, wherein the thermoelectric element generates a first voltage ($U_1$) depending on the heating of the conductor section, and an amplifier circuit of the protective apparatus amplifies the first voltage ($U_1$) for generating the ignition voltage ($U_Z$).

* * * * *